Jan. 3, 1967 W. H. KINARD ETAL 3,296,526
MICROMETEOROID VELOCITY MEASURING DEVICE
Filed March 29, 1963 3 Sheets-Sheet 1

INVENTORS
WILLIAM H. KINARD
CHARLES C. LANEY, JR.

BY Howard J. Osborn
William H. King
ATTORNEYS

INVENTORS
WILLIAM H. KINARD
CHARLES C. LANEY, JR.

Jan. 3, 1967   W. H. KINARD ETAL   3,296,526
MICROMETEOROID VELOCITY MEASURING DEVICE
Filed March 29, 1963   3 Sheets-Sheet 3

INVENTORS
WILLIAM H. KINARD
CHARLES C. LANEY, JR.

BY Howard J. Osborn
William H. King
ATTORNEYS

United States Patent Office 3,296,526
Patented Jan. 3, 1967

3,296,526
MICROMETEOROID VELOCITY MEASURING DEVICE
William H. Kinard, Williamsburg, and Charles C. Laney, Jr., Portsmouth, Va., assignors to the United States of America as represented by the Administrator of the National Aeronautics and Space Administration
Filed Mar. 29, 1963, Ser. No. 269,215
4 Claims. (Cl. 324—70)

The invention described herein may be manufactured and used by or for the Government of the United States of America for governmental purposes without the payment of any royalties thereon or therefor.

This invention relates to a velocity measuring device and more particularly to a device for measuring the velocities of micrometeoroids in space.

One of the hazards of space is the impact of micrometeoroid particles against space operating vehicles. By measuring the velocities of these particles an indication can be obtained of the damage to expect from their impacts with space vehicles. Also, by measuring the velocities of these particles, their orbits in space can be determined which will give an indication of their origin.

At present, there are no devices known to the inventors developed for measuring micrometeoroid velocities in space. The velocities of larger meteoroids (0.1 inch diameter and larger) have been measured by observing them as meteor streaks entering the earth's atmosphere using ground based instruments.

The micrometeoroids which are of most interest to space vehicle designers due to their greater population can not be detected as meteors entering the earth's atmosphere. Even if they could be detected, it is also necessary to measure the velocity of micrometeoroid particles at locations in space other than in the outer edge of the earth's atmosphere. Measurements of the velocities of micrometeoroids at other locations in space would be necessary for example to determine if a band of micrometeoroids exist in orbit around the earth.

It is therefore an object of this invention to provide a device for measuring the velocities of micrometeoroids.

Another object of this invention is to provide a device for measuring the velocities of micrometeoroids which are outside the earth's atmosphere.

A further object of this invention is to put into space a device for measuring the velocities of micrometeoroids and for sending these measurements back to earth.

A still further object of this invention is to put into space two micrometeoroid detecting elements located a known distance apart so that the times between the detections made by these two elements will be indicative of the velocities of micrometeoroids detected.

Yet another object of this invention is to provide a micrometeoroid velocity measuring device whereby the measurement is accomplished by spaced capacitors.

Other objects and a fuller understanding of this invention may be had by referring to the following specification and the accompanying drawings in which.

The essential parts of this invention consist of two micrometeoroid particle detectors with each including a detecting element. Each of these particle detectors will produce an electrical signal whenever a particle passes through its detecting element. These two detecting elements are located a known distance apart and are of such a size and configuration that all particles traveling through both of them will have trajectories of approximately the same length while traveling between them. Consequently, the time intervals between two signals produced by the two detectors caused by a particle traveling through both detecting elements is indicative of the velocity of the particle. This invention also includes means connected to the two detectors for producing voltages whose amplitudes are proportional to the time intervals between the signals produced by the two detectors; and means for transmitting these voltages back to earth.

In one embodiment of this invention, the two detecting elements consists of two concentric cylindrical aluminum-Mylar-aluminum sandwiches. Each of these detecting elements is an electrical capacitor before a micrometeroid particle contacts it; then, when it is contacted and penetrated by a micrometeroid particle its two plates are momentarily shorted together. After the particle has passed through the detecting element, it is again an electrical capacitor. Each of these detecting elements is connected in series with a voltage source and an electrical resistor. Before a particle contacts the detecting element all of the voltage of the voltage source is applied across the detecting element. While a particle is passing through the detecting element, its plates are shorted together and most of the voltage of the voltage source is applied across the resistor. This voltage across the resistor is the signal produced by the detector.

In another embodiment of this invention, two flat aluminum-Mylar-aluminum sandwiches are used as the two detecting elements for the two detectors. In this embodiment, armored shields with a hole in each are used to cover the detecting elements. Particles will not penetrate the shield but will go through the holes. The purpose of this structure is to limit the trajectories of the particles that penetrate both of the detecting elements.

In a further embodiment of this invention the two detectors include two flat thin metal diaphragms as the two detecting elements. These metal diaphragms are covered by an armored shield with a hole in it. The particles will not penetrate the armored shield but will penetrate the thin metal diaphragms and produce flashes of light. These flashes of light are converted into electrical signals by two light-sensitive photo tubes focused on the thin metal diaphragms.

Figure 1:
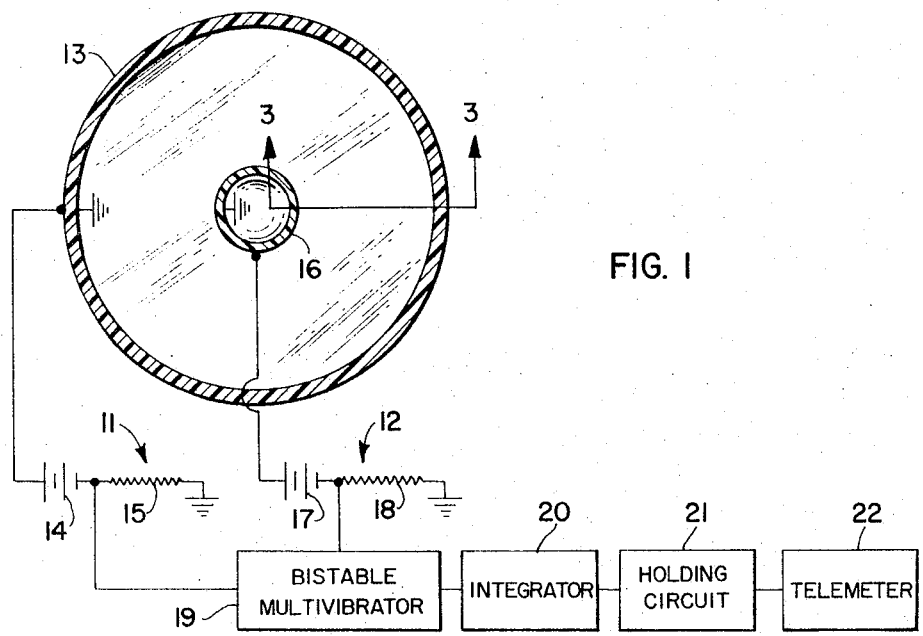
FIGURE 1 shows a schematic and block diagram of one embodiment of this invention.

Referring now to FIG. 1, a first particle detector is shown generally as 11 and a second particle detector is shown generally as 12. Detector 11 consists of a cylindrical detecting element 13, a voltage source 14 and a resistor 15 all connected in series. One side of detecting element 13 is grounded with its other side connected to the positive side of voltage source 14; and one end of resistor 15 is connected to the negative side of voltage source 14 with its other end grounded. Detector 12 consists of a cylindrical detecting element 16, a voltage source 17 and a resistor 18 all connected in series. One side of detecting element 16 is grounded with its other side connected to the positive side of voltage source 17; and one end of resistor 18 is connected to the negative side of voltage source 17 with its other end grounded.

The detecting elements 13 and 16 are made of very thin Mylar plastic or some similar nonconducting material with a metal, such as aluminum, coating on each side. These two detecting elements are two capacitors with the nonconducting material being the dielectric and with the metal coatings being the plates. The thickness of these detecting elements are not great enough to stop or to appreciably decrease the velocities of the particles penetrating them. Whenever a particle penetrates either of the two charged detecting elements an ionization is created between the two plates of the detecting element which essentially shorts these two plates together.

Figure 2:
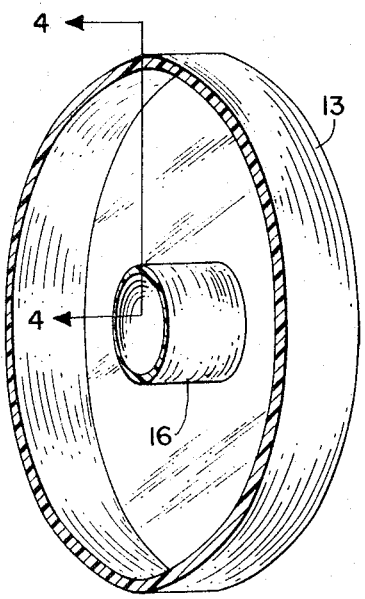
FIGURE 2 shows a perspective drawing of the detecting elements used in FIG. 1.

FIGURE 2 shows a perspective drawing of the detecting elements 13 and 16 shown in FIG. 1. As can be seen from this drawing, detecting element 13 is of a cylindrical construction having a diameter much greater than the diameter of the cylindrical detecting element 16 and having a length approximately equal to the diameter of detecting element 16. Detecting element 16 is made concentric with detecting element 13 by means of supporting rings which will be disclosed later.

Figure 3:
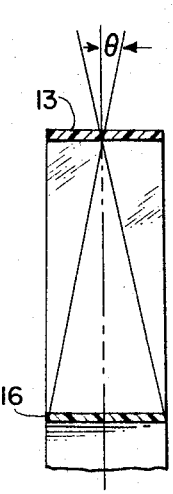
FIGURE 3 shows a cross sectional view taken along section lines 3—3 of FIG. 1.
Figure 4:
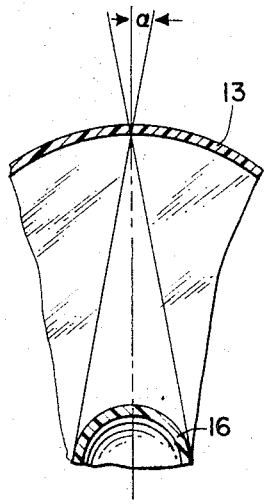
FIGURE 4 shows a cross sectional view taken along the section lines 4—4 of FIG. 2.

FIGURE 3 shows a partial side view taken along section lines 3—3 of FIG. 1. The center line is a line normal to the surface of detecting element 13 in the plane of FIG. 3. The other lines, each of which makes an angle $\theta$ with the center line, illustrate the maximum angle that the trajectory of a particle can make with the normal when it penetrates detecting element 13 and still contact detecting element 16. Angle $\theta$ is small since the distance between detecting elements 13 and 16 is large relative to the lengths of these detecting elements. FIGURE 4 shows a cross sectional view taken along the section lines 4—4 of FIG. 2. This figure illustrates the maximum angle $\alpha$ that the trajectory of a particle can make with the normal to the surface of detecting element 13 in the plane of FIG. 4 and still contact detecting element 16. Since the diameter of detecting element 16 is approximately equal to the length of detecting element 16, angle $\alpha$ is approximately equal to angle $\theta$ and both angles are small. Therefore, all particles that penetrate both detecting element 13 and detecting element 16 will have trajectories of approximately the same length while traveling between the two detecting elements.

Referring again to FIG. 1, the signals produced across resistors 15 and 17 caused by particles penetrating detecting elements 13 and 16, respectively, are applied to a bistable multivibrator 19. This multivibrator has two possible outputs: it either has a zero voltage output or a constant amplitude positive voltage output. Multivibrator 19 is initially producing a zero output voltage. Whenever a signal is developed across resistor 15, it is applied to the multivibrator which will change the output of the multivibrator from a zero voltage to a constant amplitude positive voltage. This constant amplitude voltage will continue at the output of the multivibrator until a signal is developed across resistor 18 or until the multibivrator resets after a predetermined time, at which times the output of the multivibrator will return to zero. The purpose of the reset for the multivibrator is to insure that the multivibrator will return to its zero output when a particle penetrates detecting element 13, but does not penetrate detecting element 16. The specific circuitry of multivibrator 19 is not disclosed in this specification since bistable multivibrators are old and well known.

The voltages generated by multivibrator 19 are applied to integrator 20 where they are integrated to produce voltages whose peak amplitudes are proportional to the time intervals between the signals produced across resistors 15 and 18. These peak amplitudes are held by a holding circuit 21 and then transmitted back to earth by a telemeter 22. Integrators, holding circuits, and telemeters are well known and are therefore not specifically disclosed in this specification. If the integrator 20 is a resistor-capacitor type, it will be necessary to discharge the capacitor at the end of each voltage generated by multivibrator 19. This can be done by well known means. For example, if the output voltages generated by multivibrator 19 are differentiated and rectified to produce sharp negative pulses at times when the output voltages end, these sharp negative pulses can be applied to a transistor connected across the capacitor to discharge it.

*Operation*

Figure 5:
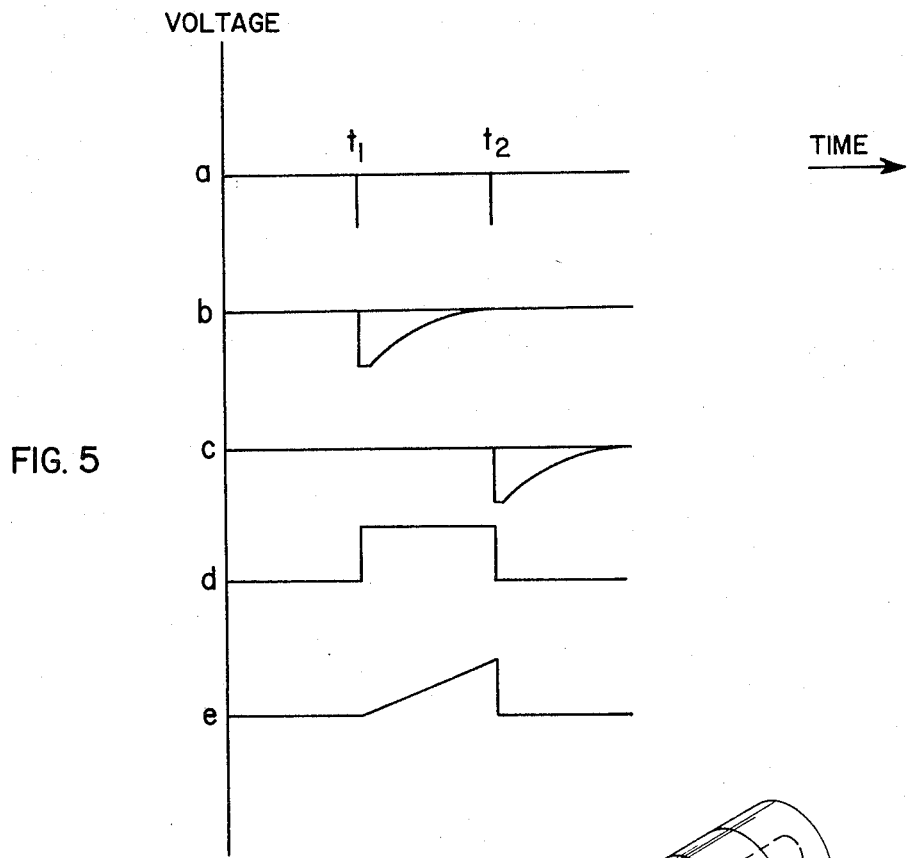
FIGURE 5 is a diagram of the different voltages in the circuit of FIG. 1 when a micrometeoroid particle penetrates both the outside and the inside detecting elements.

The operation of the device shown in FIG. 1 will now be described while referring to the voltage diagram shown by FIG. 5. The detecting elements 13 and 16 are placed in space in the path of the micrometeoroid particles whose velocities are to be measured. Before a micrometeoroid particle penetrates detecting element 13, all of the voltages of voltage sources 14 and 17 appear across the plates of detecting elements 13 and 16, respectively. There are no voltage drops across resistors 15 and 18 since detecting elements 13 and 16 are capacitors that are fully charged. When at a time $t1$ (shown by FIG. 5a) a particle penetrates detecting element 13, the two plates of the detecting element are shorted together causing a very low voltage to appear across these two plates. At this time, almost all of the voltage of voltage source 14 appears across resistor 15. After the particle has passed through detecting element 13, the detecting element again starts functioning as a capacitor. Current will then flow in the circuit due to the exponential charging of detecting element 13. This results in a signal across resistor 15 with an exponential decay whose time constant is the capacitance of detecting element 13 times the resistance of resistor 15. The voltage drop across resistor 15 is shown by FIG. 5b. This voltage is applied to bistable multivibrator 19 which starts to generate a voltage at the instant that a voltage first appears across resistor 15. When the same particle that penetrated detecting element 13 also penetrates detecting element 16 at a time $t2$ (shown by FIG. 5a) a voltage is generated across resistance 18 in the same manner that the voltage was generated across resistor 15. The voltage drop across resistor 18 is shown by FIG. 5c. This voltage is applied to bistable multivibrator 19 which causes the multivibrator to stop generating a voltage at the instant that a voltage first appears across resistor 18. Consequently, the multivibrator 19 generates a constant amplitude voltage for a duration equal to the time $t2$ minus the time $t1$ that it takes for the particle to travel from detecting element 13 to detecting element 16. This voltage is shown by FIG. 5d. This constant amplitude voltage is integrated by integrator 20 to produce a triangular voltage which is shown by FIG. 5e. The amplitude of the peak of this triangular voltage is proportional to the velocity of the particle that penetrated detecting elements 13 and 16. The peak of this triangular voltage is held by holding circuit 21 until it is transmitted to earth by telemeter 22.

Figure 6:
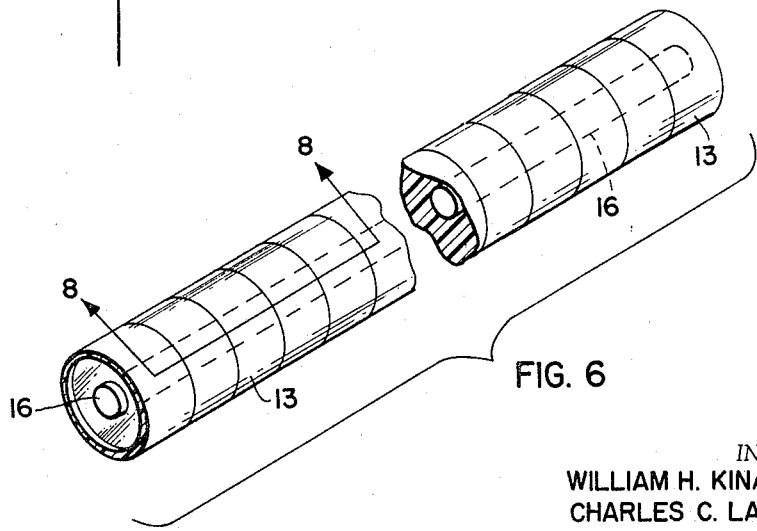
FIGURE 6 shows a plurality of the detecting elements shown in FIG. 2 attached together.
Figure 7:
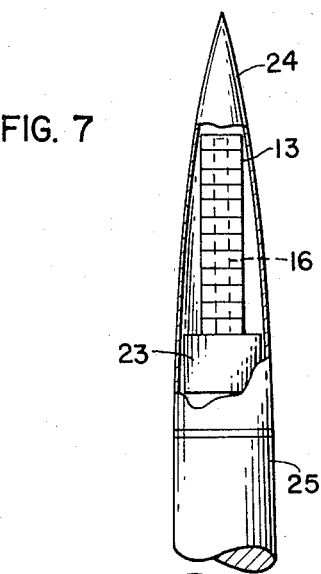
FIGURE 7 shows a rocket vehicle with a micrometeoroid velocity measuring device mounted in its nose cone.

Any number of velocity measuring units can be placed adjacent to each other as shown by FIG. 6. This use of multiple units will increase the rate of measurement of particle velocities because of the greater exposed area. When multiple units are used it is necessary that they be electrically insulated from each other. A ring of any insulating material such as Mylar, can be placed between the units to insulate them from each other. The micrometeoroid velocity detectors will be launched in space in the nose cone of a rocket vehicle. They can either be placed in orbit about the earth or fired as a deep space probe depending on the data required. FIGURE 7 shows detecting elements 13 and 16, and electronic circuitry 23 mounted in the nose cone 24 of a rocket 25. The electronic circuitry 23 consists of the circuitry shown in FIG. 1. During launch the rocket nose cone 24 will protect the detectors from the launch environment. Once in space the nose cone 24 will be ejected exposing the detectors to micrometeoroid impacts.

Figure 8:
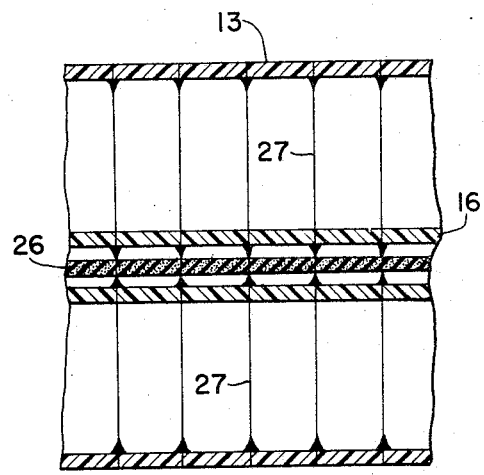
FIGURE 8 shows a cross sectional view taken along the section lines 8—8 of FIG. 6 illustrating how the detecting elements inflate when they are ejected into space.

If an exposed area for detecting velocities greater than can be erected beneath the rocket nose cone is desired, then the detecting elements 13 and 16 can be folded compactly in the nose cone 24 and erected once the nose cone is ejected in space. The erection in space of the detecting elements can be accomplished by placing in the inner detecting element 16 a rod of highly compressable sponge material 26 shown by FIG. 8. Support rings 27 are mounted on sponge rod 26 and attached to the detecting elements to insure that the two detecting elements are concentric about the sponge rod 26 when the compressed sponge of the rod material is released in space and allowed to expand. Each of the support rings 27 consists of rings attached to the insides of detecting elements 13 and 16 with spokes connecting these two rings and the sponge rod 26 together. When the sponge rod 26 is compressed the detecting elements 13 and 16, and support rings 27 will fold up like an accordion. When the sponge rod 26 is allowed to expand the detecting elements will unfold and assume the positions shown by FIG. 8.

Figure 9:
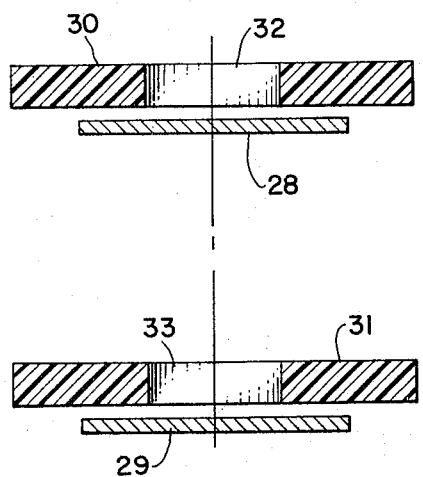
FIGURE 9 shows two other detecting elements which can be used in another embodiment of this invention.

FIGURE 9 shows the two detecting elements used in another embodiment of this invention. Instead of the two concentric cylindrical detecting elements 13 and 16, two flat detecting elements 28 and 29 spaced a known distance apart are used. These two detecting elements are made from the same materials as detecting elements 13 and 16. In this embodiment, two armor shields 30 31 are placed in front of the detecting elements 28 and 29, respectively. Micrometeoroid particles will not penetrate shields 30 and 31; however, two holes 32 and 33 are cut in shields 30 and 31, respectively, to expose only a limited area of the detecting elements to the impacts of micrometeoroid particles. Any particle that penetrates detecting element 28 and has a trajectory that makes a large angle with the normal to the plane of detecting element 28 will not penetrate detecting element 29 because it will strike shield 31. This insures that all particles that penetrate both detecting elements 28 and 29 will travel approximately the same distance between them.

Figure 10:
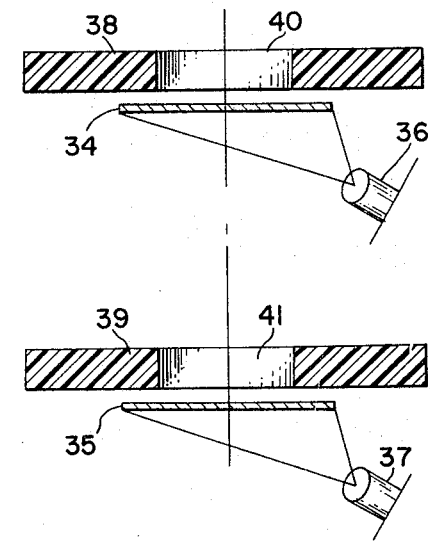
FIGURE 10 shows two other detectors which can be used in a further embodiment of this invention.

FIGURE 10 shows the two detectors used in a further embodiment of this invention. Thin metal diaphragms 34 and 35 are placed a known distance apart. When particles penetrate these metal disphragms they produce impact flashes of light. Light-sensitive photo tubes 36 and 37 are placed in positions to detect these impact flashes and to produce electrical signals. These electrical signals can be used to control bistable multivibrator 19 in FIG. 1 in the same way that the voltages produced across resistors 15 and 18 were used to control the multivibrator. For the same purpose that the two armored shields were used in FIG. 9, armor shields 38 and 39 with holes 40 and 41, respectively, are used to cover metal diaphragms 34 and 35. The detectors shown by FIG. 10, in addition to being put into space by a rocket, could be attached to the wings or body of a space vehicle.

Prior means of measuring the velocities of meteoroids require that the meteoriods enter the earth's atmosphere and be recorded by ground based instruments. This restricts the velocity measurements to relatively large particles entering the earth's atmosphere. The disclosed velocity measuring device can be used to measure very small micrometeoroids at any location in space to which the device can be placed. The device is low in weight, making it easy to launch, requires a small amount of electrical power to operate, and can measure the velocities of a great number of particles without being rendered useless.

It will be apparent to those skilled in the art that the novel principles of the invention disclosed herein in connection with specific exemplifications thereof will suggest various other modifications and applications of the same. For example, different time interval measuring devices could be used. It is accordingly desired that in construing the breadth of the appended claims they shall not be limited to the specific exemplifications of the invention described herein.

What is claimed is:

1. A micrometeoroid velocity measuring device comprising: a first micrometeoroid detector, including a first cylindrical detecting element, for producing an electrical signal each time a micrometeoroid particle penetrates said first detecting element; a second micrometeoroid detector, including a second cylindrical detecting element concentric within and spaced from said first detecting element, for producing an electrical signal each time a micrometeoroid particle penetrates said second detecting element; and means connected to said first and second micrometeoroid detectors for measuring the time differences between the signals produced by said first and second micrometeoroid detectors whereby said time differences are directly proportional to the velocities of the micrometeoroid particles that penetrate both said first and second detecting elements.

2. A micrometeoroid velocity measuring device as claimed in claim 1 wherein the diameter of said first detecting element is several times larger than the diameter of said second detecting element and the diameter of said first detecting element is several times larger than the lengths of said first and second detecting elements whereby all micrometeoroid particles that penetrate both said first and second detecting elements will have trajectories between the two detecting elements of substantially the same length.

3. A micrometeoroid velocity measuring device as claimed in claim 1 wherein each of said detecting elements consist of a layer of dielectric material coated on each side with a metal to form a capacitor whereby each time a micrometeoroid particle penetrates the detecting element the metal coatings are momentarily shorted together.

4. A micrometeoroid velocity measuring device comprising: two thin metal diaphragms, which cause impact flashes when micrometeoroid particles penetrate them, spaced from each other and located in the paths of the micrometeoroid particles whose velocities are to be measured; a light-sensitive phototube associated with each of said thin metal diaphragms for detecting said impact flashes and producing electrical signals therefrom; means for assuring that all micrometeoroid particles that penetrate both of said two thin metal diaphragms have trajectories that are substantially perpendicular to the two diaphragms and hence have trajectories of substantially the same length between the two diaphragms; and means connected to said light-sensitive phototubes for measuring the time interval between the signals produced by the phototubes whenever a micrometeoroid particle penetrates both of said thin metal diaphragms whereby said measured time interval is proportional to the velocity of the micrometeoroid particle.

References Cited by the Examiner

UNITED STATES PATENTS

| 2,301,195 | 11/1942 | Bradford | 324—68 |
| 2,485,584 | 10/1949 | Ginzton | 324—68 |
| 2,636,993 | 4/1953 | Jakobson | 250—71.5 |
| 2,866,935 | 12/1958 | Robillard | 324—68 |
| 3,222,596 | 12/1965 | Meyer et al. | 324—70 |

FOREIGN PATENTS

| 204,706 | 10/1924 | Great Britain. |

WALTER L. CARLSON, *Primary Examiner.*

RUDOLPH V. ROLINEC, *Examiner.*

M. J. LYNCH, *Assistant Examiner.*